United States Patent Office 3,318,858
Patented May 9, 1967

3,318,858
METHOD FOR POLYMERIZING OLEFINS IN THE PRESENCE OF A COORDINATION CATALYST MODIFIED BY THE PRESENCE OF A SULFUR CONTAINING COMPOUND
Kohei Nakaguchi, Masaaki Hirooka, and Toshimichi Fujita, Niihama-shi, Japan, assignors to Sumitomo Chemical Company, Ltd., Osaka, Japan, a corporation of Japan
No Drawing. Filed July 30, 1963, Ser. No. 298,553
Claims priority, application Japan, Aug. 6, 1962, 37/33,604; Aug. 7, 1962, 37/34,194; June 14, 1963, 38/31,702
11 Claims. (Cl. 260—93.7)

The present invention relates to a method for manufacturing crystalline polyolefins. In another aspect, the present invention relates to the improvement in the process of the polymerization of olefins using a catalyst system composed of an organometallic compound of a metal belonging to Groups I to III of Mendelyeev's Periodic Table and a halide of a transition metal belonging to Groups IV to VI of the Periodic Table. The term "the Periodic Table" employed herein means Mendelyeev's Periodic Table.

It is well known that crystalline polyolefins are produced by polymerization of an α-olefin using a catalyst system composed of an organometallic compound of a metal belonging to Groups I and III of the Periodic Table and a halide of a transition metal belonging to Groups IV to VI of the Periodic Table. It is also well known that a combination of an organoaluminum compound with a solid titanium halide having a valency, below its maximum, is suitable for the production of crystalline polyolefins and results in a high yield. When, for instance, a catalyst system consisting of triethylaluminum and titanium trichloride is used for the polymerization of propylene, 75–85% by weight of the total polymer product is insoluble in boiling heptane. When a catalyst system consisting of diethylaluminum chloride and titanium trichloride is used, 80–90% by weight of the product is insoluble in boiling heptane. Thus, the polymer product always contains 10–25% by weight of amorphous polymer which is soluble in boiling heptane, even when the catalyst systems known to be those yielding comparatively high proportion of the crystalline polymer are employed.

The physical properties, especially the mechanical properties, of crystalline polyolefins are deteriorated in the presence of amorphous polymer, and minimization of the content of the amorphous polymer is desirable. Accordingly, the conventional production of crystalline polyolefins entails the removal of amorphous polymer from the polymerization product. This fact means not only consumption and loss of olefin monomer used for the formation of the amorphous polymer in the polymerization reaction, but also great cost and prodigious labor for the procedure of extraction and removal of the amorphous polymer.

Therefore, a catalyst system that forms a polymer containing no, or an unobjectionably small amount of amorphous polymer has been awaited. If such a catalyst system could be developed, an advantage would be gained in the omission of the extracting procedure of the amorphous polymer heretofore conducted and in the saving of heat energy and chemicals such as solvent. Moreover, needlessness of the extraction of the amorphous polymer from the product may make possible polymerization in a solvent-free reaction system, i.e. without using any expensive solvent, or may make possible at least polymerization using any solvent which may not dissolve the amorphous polymer.

Accordingly, it is an object of the present invention to provide a method for manufacturing crystalline polyolefins by use of a novel catalyst system. Another object is to provide a process for the polymerization of an α-olefin which can yield directly solid polyolefin containing only a small amount of amorphous polymer, in other words, which needs no procedure of extraction or separation of amorphous polymer, or which permits simplification of such procedure. Still another object is to provide a process of the polymerization of α-olefin, which makes possible omission of the polymerization medium, or use of a liquid medium which hardly dissolves amorphous polymer. Another aspect of this invention provides a novel catalyst system employable for the polymerization of α-olefin, which contains, as one component, an organosulfur compound. Other objects and advantages would be apparent from the following description.

The present inventors provide a method for manufacturing polyolefin which comprises contacting an α-olefin with a catalyst system comprising an organometallic compound of a metal belonging to Groups I to III of Mendelyeev's Periodic Table, a halide of a transition metal belonging to Groups IV to VI of the Periodic Table in which the valency of the metal is below its maximum, and, as the third component, an organosulfur compound selected from the group consisting of (A) benzothiazole compounds having the general formula,

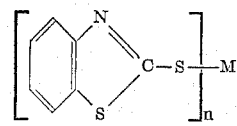

(B) benzimidazole compounds having the general formula,

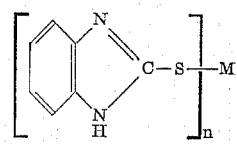

(C) phenothiazine, and its derivatives, (D) compounds having the general formula, $$Z[(CH_2)_mY]_2$$

and (E) compounds having the general formula,

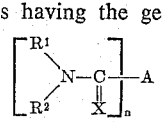

wherein M represents a metal, an ammonium radical, a hydrogen atom, or an organic residue; $n$ represents an integer from 1 to 4; Z represents S, $S_2$, SO or $SO_2$; Y represents a member of COOR, COR or OR, R being hydrogen or a hydrocarbon residue, $m$ represents an integer from 1 to 10; X represents S or O; $R^1$ and $R^2$ each represent hydrogen or a hydrocarbon residue; and A represents $X_nMe$, $XHR^3$, $X_nR^4$ or $X_p$, wherein Me is a metal or ammonium radical, $R^3$ is amine or substituted amine, $R^4$ is a hydrocarbon residue, and $p$ is an integer from 1 to 4.

The preferred organometallic compounds of metals belonging to Groups I to III of Mendelyeev's Periodic Table, employed in the invention include those of lithium, sodium, potassium, beryllium, magnesium, zinc, cadmium, boron, aluminum, and gallium. Particularly, organometallic compounds of aluminum and zinc are suitable. These organometallic compounds have at least one organic residue directly attached to the metal through C-metal linkage. As to the organic residue, a hydrocarbon residue having 1 to 20 carbon atoms, for example, alkyl, aryl, aralkyl, or cycloalkyl radical, is preferable. Among these are included methyl, ethyl, propyl, butyl, hexyl, phenyl, tolyl, cyclohexyl and cyclopentadienyl. Thus, illustrative examples of the organometallic compound are triethylaluminum, triisobutylaluminum, trihexylaluminum, diethylaluminum chloride, diethylaluminum bromide, diisobutylaluminum chloride, di-n-hexylaluminum chloride, diphenylaluminum chloride, dicyclohexylaluminum chloride, dicyclopentadienyl aluminum chloride, ethylaluminum sesquichloride, ethylaluminum dichloride and diethylzinc. Among those, the dialkylaluminum halides give the best results.

The halides of transition metals belonging to Groups IV to VI of Mendelyeev's Periodic Table include halides of titanium, zirconium, vanadium, chromium, molybdenum, wolfram. Examples of such transition metal halides are titanium trichloride and titanium tribromide, titanium triiodide, vanadium trichloride, chromium trichloride. Titanium trichloride is especially suitable. These halides may contain other constituents. For example, titanium trichloride produced by a reduction of titanium tetrachloride with aluminum contains aluminum in an atom ratio of Ti:Al of about 3:1. Such a titanium trichloride advantageously also be employed. Moreover, these metal halides display higher efficacy when activated by ball milling.

The organosulfur compounds employed as the third component in the catalyst system according to the present invention are those well-known to be effective as rubber chemicals, such as antioxidants and vulcanization accelerators, and oxidation stabilizers of polyolefins. The fact that oxidation stabilizers of polyolefins are effective as one component of the polymerization catalyst, is very interesting.

Such organosulfur compounds may be chosen from the various rubber chemicals and stabilizers as identified hereunder. Group (A) comprises benzothiazole compounds having the general formula

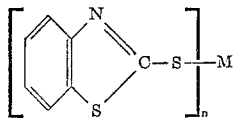

wherein M and $n$ are as identified above. When M is a metal, it may preferably be chosen from lithium, sodium, postassium, copper, magnesium, calcium, zinc, cadmium, aluminum, tin, lead, selenium, tellurium, chromium, iron, cobalt and nickel. When M is an organic residue, it may preferably be chosen from alkyl, aryl, aralkyl, cycloalkyl, and other hydrocarbon residues, having 1 to 20 carbon atoms, preferred residues being methyl, ethyl, propyl, butyl, octyl, phenyl, tolyl, cyclohexyl, and cyclopentadienyl radicals. Or, it may preferably be chosen from hydrocarbon residues containing at least one hetero atom such as nitrogen and sulfur, and those attached through such a hetero atom; e.g. N,N-dimethylamino, N,N-diethylamino, N,N-dipropylamino, cyclohexylamino, morpholino, benzothiazolylthio, and benzimidazolylthio radicals. Accordingly, typical compounds in the group (A) are mercaptobenzothiazole, zinc, copper, and nickel salts of mercaptobenzothiazole, dibenzothiazolyl disulfide, N-cyclohexyl-2-benzothiazolylsulfenamide, N,N - di - isopropyl - 2 - benzothiazolylsulfenamide and benzothiazolyl morpholino sulfide.

Group (B) comprises benzimidazole compounds having the general formula

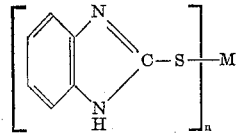

wherein M and $n$ are as identified above. Examples of M are the same as mentioned in the explanation group (A). Accordingly, the typical compounds are those corresponding to the benzothiazole compounds in which the benzothiazole nucleus is replaced by the benzimidazole nucleus.

The compounds (C) are phenothiazine and its derivatives.

Group (D) comprises compounds having the general formula, $$Z[(CH_2)_mY]_2$$

wherein Z, $m$ and Y are as identified above. Accordingly, Y is chosen from COOR, COR and OR, and R is chosen from hydrogen and hydrocarbon residues, such as alkyl, aryl, aralkyl and cycloalkyl, having 1 to 20 carbon atoms, for example, methyl, ethyl butyl, hexyl, octyl, lauryl, phenyl, tolyl, cyclohexyl, methylcyclohexyl and cyclopentadienyl. Thus, the compounds in the group (D) involve various thioether, disulfide, sulfoxide and sulfon compounds of various carboxylic acids, their esters, aldehydes, ketone, ethers and alcohols, for example, thiodipropionic acid, thiodipropionic acid monobutyl ester, thiodipropionic acid dilauryl ester, thiodiglycolic acid dioctyl ester, thionyldipropionic acid, sulfon dipropionic acid didodecyl ester, thiodipropionaldehyde, thiodiglycol, thiodiglycoldilaurylketone, thiodiglycol dibenzyl ether and dibenzyloxyethyl sulfoxide.

Group (E) comprises compounds having the general formula,

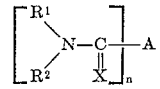

wherein $R^1$, $R^2$, X, $n$ and A are as identified above. Accordingly, such compounds involve various thiolcarbamic, thionocarbamic, and dithiocarbamic acids, and their salts and esters, as well as thiuramsulfide compounds. In symbol A which may be any of $X_nMe$, $XHR^3$, $X_nR^4$ and $X_p$, Me may be ammonium radical or any of the metals as identified in M. $R^3$ may be any of the amines such as triethylamine, diethylamine, tert.-butylamine, methylamine, aniline, pyridine, piperidine, picoline, quinoline, acrydine and guanidine. As $R^1$, $R^2$ and $R^4$, various hydrocarbon residues are employable, such as alkyl, aryl aralkyl, cycloalkyl, and others, for example, methyl, ethyl, propyl, butyl, phenyl, tolyl, cyclohexyl, and the like. Typical compounds involve sodium diethyldithiocarbamate, ammonium dimethyldithiocarbanate, zinc dimethyldithiocarbamate, copper (II) dimethyldithiocarbamate, tin (IV) dimethyldithiocarbamate, nickel dimethyldithiocarbamate, selenium (IV) diethyldithiocarbamate, zinc ethylphenyldithiocarbamate, disodium ethylene-bis-dithiocarbamate, zinc ethylene-bis-dithiocarbamate, triethylammonium dimethyldithiocarbamate, pyridinium dimethyldithiocarbamate, selenium (IV) dithiocarbamate, methyl diethyldithiocarbamate, ethyl diethyldithiocarbamate, methyl dimethyldithiocarbamate, cyclohexyl dimethyldithiocarbamate, ethyl dicyclohexyldithiocarbamate, potassium dimethylthiolcarbamate, guanyl diphenylthiolcarbamate, zinc thionocarbamate, ethyl dimethylthionocarbamate, methyl dimethylthionocarbamate, n-butyl dimethylthionocarbamate, phenyl dimethylthionocarbamate, ethyl diethylthionocarbamate, tetramethylthiuram monosulfide, tetramethylthiuram disulfide, tetraethylthiuram disulfide, dipentamethylenethiuram tetrasulfide and bisdiphenylaminoformyl disulfide.

The proportion of the organometallic compound of metals belonging to Groups I to III of Mendelyeev's Periodic Table and the halide of transition metals belonging to Groups IV to VI of the Periodic Table, may be chosen within the range known in the conventionally employed methods. For instance, the organometallic compound of metals belonging to Groups I to III of the Periodic Table may be in a proportion of 0.1 to 100 moles per mole of the halide of transition metals belonging to Groups IV to VI of the Periodic Table.

The amount of organosulfur compounds, the third components of the catalyst systems, may be employed within a broad range. In some cases, the third component tends to retard the polymerization reaction, and, the use of too much of the third component yields unfavorable results. Accordingly, the amount of the third component should be determined depending upon the kind of the component and other polymerization conditions, so as not to lower the rate of the polymerization. However, the present third component exhibits an extremely superior effect for the improvement of stereospecificity and crystallinity of the polymer product even when such a small amount as not significantly affecting the rate of polymerization, is employed. In some cases, the said third components do not retard, but even elevate the rate of polymerization. Generally speaking, the organosulfur compound, the third component, may be employed in a proportion of 0.001 to 20 moles, preferably 0.01 to 1 mole, per mole of the halide of transition metal of Groups IV to VI of the Periodic Table. If desired or if required, a proportion not falling within the range as above-mentioned may be employed.

To prepare the catalyst system of the present invention, the three components may be mixed in an arbitrary sequence. For instance, an organosulfur compound may be mixed with an organometallic compound of a metal of Groups I to III of the Periodic Table, and the mixture may be heated if desired. Then, a halide of a transition metal belonging to Groups IV to VI of the Periodic Table is added to the mixture.

The polymerization of α-olefins according to the invention is effected by contacting an α-olefin with the catalyst system as described above. The temperature for the polymerization reaction may be from room temperature to 120° C., particularly, from 50° to 90° C. The pressure for the reaction may be from atmospheric pressure to 100 kg./cm.$^2$ gauge, depending upon the α-olefin employed. In general, a pressure of 0 to 15 kg./cm.$^2$ gauge is preferable.

The polymerization of the present invention is suitably carried out in the presence of a solvent which is inert to the reaction. Suitable are hydrocarbon solvents for example, aliphatic, alicyclic and aromatic hydrocarbon solvents, such as propane, butane, pentane, hexane, heptane, octane, cyclohexane, methylcyclohexane, Tetralin, Decalin, benzene, toluene, xylene, liquid paraffin, and various saturated petroleum fractions. Also, halogenated hydrocarbon solvents may be suitably employed, such as chlorobenzene, chloronaphthalenes and ortho-dichlorobenzene.

As mentioned above, it is a feature of the method of the present invention that the separation procedure for amorphous polymer after the polymerization is not required since the present method produces a crystalline polymer. Accordingly, a polymerization system containing a solvent which does not dissolve amorphous polymer and which is therefore considered not to be so adequate for the conventional polymerization systems, for example, propane, butane, pentane and hexane, or a polymerization system in which the monomer serves as solvent, may be employed effectively. Alternatively, a polymerization system containing no solvent may be employed. For example, polyolefins may be continuously produced in a fluidized system in which the catalyst system is supported on a carrier.

The α-olefins to be polymerized according to the method of the present invention are preferably those having carbon atoms 3 to 10. As the exemplified α-olefins, propylene, butene-1, pentene-1, 2-methylpentene-1, hexene-1, and styrene may be mentioned. Particularly, the method of the invention is adequately applied for the production of a stereospecific polymer of propylene.

In carrying out the method of the present invention, various modifications can be made. For instance, an additive may be added during polymerization in order to control the molecular weight of the polymer produced. The molecular weight of the polymer may be restricted to a desired degree without affecting the crystallinity of the polymer, by addition of hydrogen to the polymerization system.

The present invention will be illustrated with reference to the following examples, which are, however, set forth merely by way of illustration and not by way of limitation.

*Example 1*

Into an 800 ml.-volume stirring-type stainless steel autoclave preliminarily flushed with nitrogen, 400 ml. of n-heptane, 1.95 g. of diethylaluminum chloride, 0.31 g. of titanium trichloride and 0.15 g. of mercaptobenzimidazole were added. Propylene was fed into the autoclave to make the pressure 5 kg./cm.$^2$ gauge at 70° C., and polymerized for 1.3 hours keeping the pressure and the temperature at that level. After the polymerization was stopped by adding methanol, 55.0 g. of polypropylene was obtained. The polymer was extracted with boiling heptane, and 94.5% by weight of the total solid polymer remained undissolved.

In the case where the same polymerization was repeated without using mercaptobenzimidazole, 88.2% by weight of the total solid polymer was insoluble in boiling heptane.

*Example 2*

The same polymerization as in Example 1 was repeated, except that 0.30 g. of mercaptobenzothiazole was employed instead of the mercaptobenzimidazole, and that the polymerization was effected for 1.8 hours. The resulting polypropylene weighed 53.1 g., of which 96.9% by weight was insoluble in boiling heptane.

Similarly, the same polymerization as in Example 1 was repeated using butene-1 instead of propylene. A highly crystalline polybutene-1 was obtained.

*Example 3*

The same polymerization as in Example 1 was repeated, except that 0.60 g. of dibenzimidazolyl disulfide was employed instead of the mercaptobenzimidazole. The resulting polypropylene weighed 51.3 g., of which 97.1% by weight was insoluble in boiling heptane.

*Example 4*

The same polymerization as in Example 1 was repeated, except that 0.36 g. of zinc salt of mercaptobenzimidazole was employed instead of the mercaptobenzimidazole, and that the polymerization was effected for 2 hours. The solid polypropylene product weighed 58.2 g., of which 96.4% by weight was insoluble in boiling heptane.

*Example 5*

The same polymerization as in Example 1 was repeated, except that 0.08 g. of phenothiazine was employed instead of the mercaptobenzimidazole, and the polymerization was effected for 2 hours. The solid polypropylene product weighed 57.9 g., of which 96.1% by weight was insoluble in boiling heptane.

*Example 6*

The same polymerization as in Example 1 was repeated, except that 0.25 g. of N-cyclohexyl-2-benzothiazolylsulfenamide was employed instead of the mercaptobenzimidazole, and that the polymerization was effected for 1.5 hours. The solid polypropylene product weighed 59.1 g., of which 97.7% by weight was insoluble in boiling heptane.

*Example 7*

The same polymerization as in Example 1 was repeated, except that 0.10 g. of N,N-di-isopropyl-2-benzothiazolylsulfenamide was employed instead of the mercaptobenzimidazole, and that the polymerization was effected for 1 hour. The solid polypropylene product weighed 50.5 g., of which 95.6% by weight was insoluble in boiling heptane.

*Example 8*

A polymerization was conducted employing 0.8 g. of thiodipropionic acid dilauryl ester (TPL) at 70° C. under a propylene pressure of 5 kg./cm.$^2$ and otherwise the same conditions as in Example 1. After 3 hours polymerization, 54.3 g. of polypropylene product was obtained, of which 95.1% by weight was insoluble in boiling heptane.

*Example 9*

The same polymerization as in Example 8 was repeated, except that 0.27 g. of dithiodipropionic acid dilauryl ester was employed, instead of TPL and that the polymerization was effected for 2.7 hours. The solid polypropylene product weighed 56.0 g., of which 96.3% by weight was insoluble in boiling heptane.

*Example 10*

The same polymerization as in Example 8 was repeated, except that 0.50 g. of sulfone-dipropionic acid dilauryl ester was employed instead of TPL. The solid polypropylene product weighed 51.7 g., of which 96.7% by weight was insoluble in boiling heptane.

*Example 11*

The same polymerization as in Example 8 was repeated, except that 0.06 g. of zinc dimethyldithiocarbamate was employed instead of TPL. The solid polypropylene product weighed 55.9 g., of which 96.1% by weight was insoluble in boiling heptane.

*Example 12*

The same polymerization as in Example 8 was repeated, except that 0.08 g. of tetramethylthiuram monosulfide was employed instead of TPL. The solid polypropylene product weighed 51.3 g., of which 94.5% by weight was insoluble in boiling heptane.

*Example 13*

Into an 800 ml. volume autoclave preliminarily flushed with nitrogen, there were placed 400 ml. of cyclohexane, 2.30 g. of triethylaluminum, 3.15 g. of vanadium trichloride and 0.38 g. of nickel salt of mercaptobenzothiazole. A polymerization was effected at 75° C. under a propylene pressure of 7 kg./cm.$^2$. The solid polypropylene product weighed 51.9 g., of which 90.7% by weight was insoluble in boiling heptane.

In case where the same polymerization was conducted without using the nickel salt of mercaptobenzothiazole, the polymer weighed 38.3 g., of which 72.6% was insoluble in boiling heptane.

What we claim is:

1. A method for producing a crystalline polyolefin which comprises contacting an α-monoolefin having 3 to 10 carbon atoms with a catalyst system comprising an organometallic compound of a metal belonging to Groups I to III of Mendelyeev's Periodic Table, a halide of a transition metal belonging to Groups IV to VI of the Periodic Table, in which the valence of the transition metal is below its maximum, and an organosulfur compound selected from the group consisting of (A) benzothiazole compounds having the general formula,

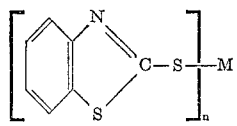

(B) benzimidazole compounds having the general formula,

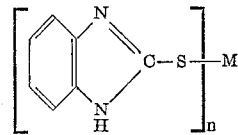

(C) phenothiazine and its derivatives,
(D) compounds having the general formula,

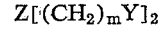

and (E) compounds having the general formula,

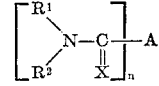

where M represents a metal, ammonium radical, hydrogen atom, or an organic residue; $n$ represents an integer from 1 to 4 and when X is O at least one of the X's in said A must be S; Z represents S, S$_2$, SO or SO$_2$; Y represents COOR, COR or OR, R being hydrogen or a hydrocarbon residue; $m$ represents an integer of 1 to 10; X represents S or O; R$^1$ and R$^2$ each represent hydrogen or a hydrocarbon residue; and A represents X$_n$Me, XHR$^3$, X$_n$R$^4$ or X$_p$, Me being a metal or ammonium radical, R$^3$ is an amine or substituted amine, R$^4$ is a hydrocarbon residue, and $p$ is an integer from 1 to 4, the molar ratio of said organometallic compound and said transition metal halide being within the range of 0.1:1 to 100:1, and the molar ratio of said organosulfur compound and said transition metal halide being within the range of 0.001:1 to 20:1.

2. A method according to claim 1, in which the said α-olefin is propylene and butene-1.

3. A method according to claim 1, in which the said organometallic compound of a metal belonging to Groups I to III of the Periodic Table has at least one organic residue directly attached to the metal through C-metal linkage, the said organic residue being a hydrocarbon residue having 1 to 20 carbon atoms, selected from the group consisting of alkyl, aryl, aralkyl, and cycloalkyl radicals, and the said metal being selected from the group consisting of lithium, sodium, potassium, beryllium, magnesium, zinc, cadmium, boron, aluminum, and gallium.

4. A method according to claim 1, in which the said organometallic compound is triethylaluminum or diethylaluminum chloride.

5. A method according to claim 1, in which the said transition metal halide belonging to Groups IV to VI of the Periodic Table is a halide of titanium, zirconium, vanadium, chromium, molybdenum or wolfram.

6. A method according to claim 1, in which the said transition metal halide belonging to Groups IV to VI of the Periodic Table is titanium trichloride or vanadium trichloride.

7. A method according to claim 1, in which the said organosulfur compound is mercaptobenzimidazole, mercaptobenzothiazole, dibenzimidazolyl disulfide, zinc salt of mercaptobenzimidazole, phenothiazine, N-cyclohexyl-2 - benzothiazolylsulfenamide, N,N-di-isopropyl-2-benzothiazolylsulfenamide, thiodipropionic acid dilauryl ester, dithiodipropionic acid dilauryl ester, sulfon-dipropionic acid dilauryl ester, zinc dimethyldithiocarbamate, tetramethylthiuram monosulfide, or nickel salt of mercaptobenzothiazole.

8. A method according to claim 1, in which the said α-olefin is contacted with the said catalyst system at a temperature between room temperature and 120° C., at a pressure of 0 to 15 kg./cm.$^2$ gauge.

9. A catalyst system comprising an organometallic compound of a metal belonging to Groups I to III of Mendelyeev's Periodic Table, a halide of a transition metal belonging to Groups IV to VI of the Periodic Table in which the valency of the transition metal is below its maximum, and an organosulfur compound selected from the group consisting of (A) benzothiazole compounds having the general formula,

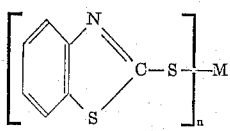

(B) benzimidazole compounds having the general formula,

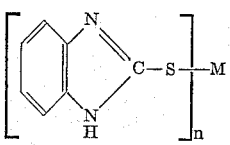

(C) phenothiazine, and its derivatives,
(D) compounds having the general formula,

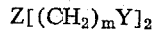

and (E) compounds having the general formula,

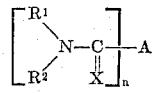

wherein M represents a metal, ammonium radical, hydrogen atom, or an organic residue; $n$ represents an integer from 1 to 4; and when X is O at least one of the X's in said A must be S; Z represents S, $S_2$, SO or $SO_2$; Y represents COOR, COR or OR, R being hdrogen or hydrocarbon residue; $m$ represents an integer from 1 to 10; X represents S or O; $R^1$ and $R^2$ each represent hydrogen or a hydrocarbon residue; and A represents $X_nMe$, $XHR^3$, $X_nR^4$ or $X_p$, Me being a metal or ammonium radical, $R^3$ is an amine or substituted amine, $R^4$ is a hydrocarbon residue and $p$ is an integer from 1 to 4, the molar ratio of said organometallic compound and said transition metal halide being within the range of 10.1:1 to 100:1, and the molar ratio of said organosulfur compound and said transition metal halide being within the range of 0.001:1 to 20:1.

10. A catalyst system comprising diethylaluminum chloride, titanium trichloride and a member selected from the group consisting of mercaptobenzimidazole, mercaptobenzothiazole, dibenzimidazolyl disulfide, zinc salt of mercaptobenzimidazole, phenothiazine, N-cyclohexyl-2-benzothiazolylsulfenamide, N,N-di-iso-propyl-2-benzothiazolylsulfenamide, thiodipropionic acid dilauryl ester, dithiodipropionic acid dilauryl ester, sulfon-dipropionic acid dilauryl ester, zinc dimethyldithiocarbamate and 1/tetramethylthiuram monosulfide.

11. A catalyst system comprising triethylaluminum, vanadium trichloride and nickel salt of mercaptobenzothiazole.

No references cited.

JOSEPH L. SCHOFER, *Primary Examiner.*

M. B. KURTZMAN, *Assistant Examiner.*